US011454722B2

(12) United States Patent
Price et al.

(10) Patent No.: US 11,454,722 B2
(45) Date of Patent: Sep. 27, 2022

(54) IR-REFLECTIVE STRUCTURAL SUPPORT FOR VIRTUAL EXPERIENCES

(71) Applicant: Microsoft Technology Licensing, LLC, Redmond, WA (US)

(72) Inventors: Raymond Kirk Price, Redmond, WA (US); Dorrene Elizabeth Brown, Seattle, WA (US); Marcelo Simoes Wolf, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 468 days.

(21) Appl. No.: 16/576,574

(22) Filed: Sep. 19, 2019

(65) Prior Publication Data

US 2021/0088665 A1    Mar. 25, 2021

(51) Int. Cl.
*G01S 17/89* (2020.01)
*G01S 7/481* (2006.01)
*G02B 5/02* (2006.01)

(52) U.S. Cl.
CPC ............ *G01S 17/89* (2013.01); *G01S 7/4815* (2013.01); *G02B 5/0284* (2013.01)

(58) Field of Classification Search
CPC ...... G01S 17/89; G01S 7/4815; G02B 5/0284
See application file for complete search history.

(56) References Cited

U.S. PATENT DOCUMENTS

| 5,712,732 A | * | 1/1998 | Street | ................... H04N 13/373 |
| | | | | 348/E13.058 |
| 9,137,511 B1 | | 9/2015 | Legrand et al. | |
| 9,465,484 B1 | | 10/2016 | Kamarshi et al. | |
| 2014/0320531 A1 | | 10/2014 | Elvesjo | |
| 2019/0278091 A1 | * | 9/2019 | Smits | ..................... G03B 35/18 |

OTHER PUBLICATIONS

"International Search Report and the Written Opinion Issued in PCT Application No. PCT/US20/038260", dated Oct. 12, 2020, 11 Pages.

* cited by examiner

*Primary Examiner* — Hugh Maupin
(74) *Attorney, Agent, or Firm* — Alleman Hall Creasman & Tuttle LLP

(57) ABSTRACT

A structure for facilitating virtual experiences comprises: a structural support having a first side facing toward an interior of the structure, a second side opposite the first side, and an intra-support hollow disposed between the first and second sides. An IR reflective surface is adjacent to at least a portion of the second side of the structural support. An IR emitter within the hollow between the first and second sides is configured to emit IR light toward the IR reflective surface, such that the IR light is reflected toward the interior of the structure.

20 Claims, 5 Drawing Sheets

IR-REFLECTIVE STRUCTURAL SUPPORT FOR VIRTUAL EXPERIENCES

BACKGROUND

Mixed reality devices may be used to present virtual images that appear, from the perspective of users of the devices, to occupy fixed positions in the real world, and to overlay virtual content with real-world content (e.g., projected video). To achieve this, mixed reality devices are often configured to use on-board sensors, external beacons, or other suitable techniques to determine and track their real-world positions.

DETAILED DESCRIPTION

As indicated above, mixed reality devices are often configured to determine and track their positions relative to a surrounding real-world environment while in use. This may be particularly beneficial in shared mixed reality experiences, in which virtual objects are presented to multiple users located in the same physical space—e.g., as part of an entertainment product, presentation, demonstration, or other shared experience. Based on its known position within the real-world environment, a mixed reality device may render and present virtual objects that appear to maintain fixed positions relative to the environment, and/or that appear to maintain fixed positions relative to users as they move throughout the environment.

In some implementations, a mixed reality device may present virtual imagery that replaces a user's view of their surrounding real-world environment. Alternatively, the user may maintain at least a partial view of the real-world environment while the device is in use, such that virtual objects are visible alongside real-world objects. Regardless, the structures described herein may be used to facilitate both types of experiences, and both types of experiences will be referred to as "mixed reality." Similarly, the devices used to provide such experiences will be referred to as "mixed reality devices."

Mixed reality devices may determine and track their own positions relative to their real-world environment in various ways. In some examples, a mixed reality device may use one or more on-board cameras to recognize nearby features or markers, the real-world positions of which are known to the mixed reality device. The mixed reality device may then use a suitable image-based localization technique to determine its own position relative to the detected features in the real-world environment. However, depending on the environment, it can be difficult for the mixed reality device to detect nearby features for image-based localization. For example, some shared virtual experiences may include flashing lights, real-world objects, other users, etc., that can interfere with a mixed reality device's ability to detect environmental features—e.g., due to occlusions or lighting changes. In some cases, the environment may include real-world video content—e.g., projected on walls of the environment—that changes over time, and the mixed reality device may be configured to render virtual content that is overlaid on the projected video. However, given that the device may move within the environment as the video changes, it can be difficult for the mixed reality device to render virtual content that appears to occupy the proper position with respect to the real-world video.

Figure 1:
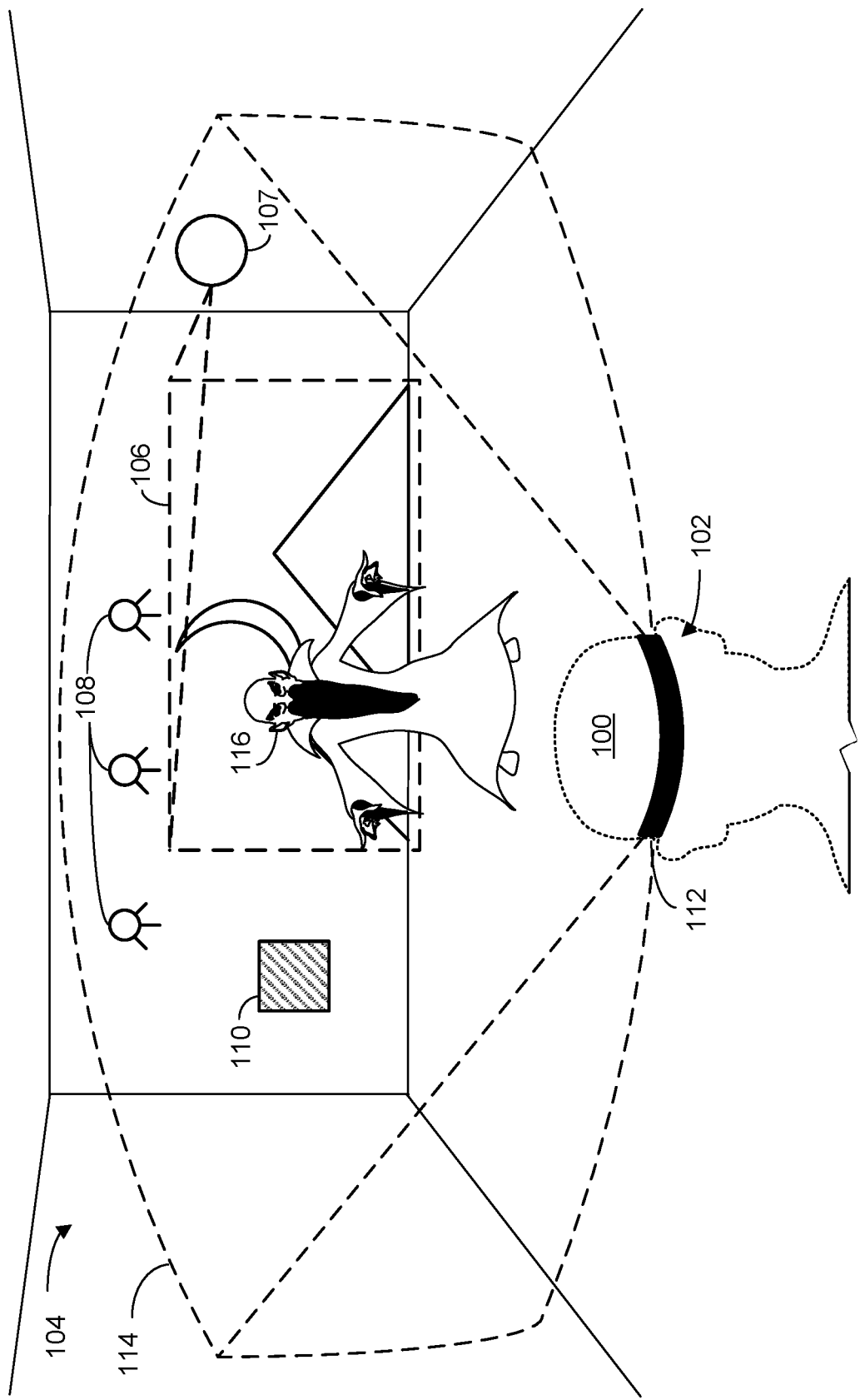
FIG. 1 schematically depicts use of a mixed reality device in a real-world environment.

This is illustrated in FIG. 1, which shows a user 100 using a mixed reality device 102 in a real-world environment 104. The real-world environment includes video content 106 shown within a dashed box and depicting a desert scene, a visible-light projector 107 providing the video content 106, flashing lights 108, and a positioning marker 110. Via a near-eye display 112 of the mixed reality device, the user has a field-of-view 114, within which virtual images presented by mixed reality device 102 are visible to user 100. Specifically, the mixed reality device is rendering and displaying a virtual wizard 116, which is not actually present in the real world, but is presented by the mixed reality device as if it occupies a fixed position relative to the surrounding environment. Specifically, the virtual wizard may be displayed in tandem with the real-world video, in order to provide an immersive experience to the user. As discussed above, in shared virtual experiences, virtual images may be presented to multiple users in the same physical space simultaneously. Thus, virtual wizard 116 may be presented with the same apparent position to other users in real-world environment 104 via other mixed reality devices. Because the virtual wizard is intended to appear in the same location for each user in the environment, each mixed reality device will typically be required to have information regarding its own real-world position, such that it can render and display the virtual wizard such that it appears at the intended position for the user.

As discussed above, a mixed reality device may use image-based localization to determine its position within an environment by recognizing one or more known features or markers. For instance, environment 104 includes a positioning marker 110, which may be used in combination with any number of other positioning markers to track the position of a mixed reality device. However, this relies on at least a threshold number of positioning markers remaining both persistently visible and distinguishable to a camera of the mixed reality device. Real world objects or special effects present in the environment may interfere with this. For instance, video content 106 and/or flashing lights 108 may disrupt the ability of any on-board cameras of the mixed reality device to properly identify and lock to objects in the scene. This, in turn, compromises the ability of the mixed reality device to determine its own real-world position and provide an immersive virtual experience.

Accordingly, the present disclosure is directed to a structure for facilitating virtual experiences. The structure includes a structural support having two sides, a first side facing toward an interior of the structure, and a second side opposite the first side. An infrared (IR) light emitter is disposed within a hollow between the two sides of the structural support, and configured to direct light toward an IR reflective surface adjacent to at least a portion of the second side. The IR light is therefore reflected into the interior of the structure, where it may be detected by mixed reality devices and used for positioning. In some cases, the structural support may include an IR transmissive surface having a non-repetitive device-localization pattern adjacent to at least a portion of the first side of the structural support. Thus, the IR light reflected by the IR reflective surface may be transmitted by the IR transmissive surface and illuminate the device-localization pattern, allowing mixed reality devices to detect unique features present in the pattern and perform image-based localization on this basis. The IR light may in some cases be diffused, either by the IR reflective surface or IR emitter, to improve the uniformity with which the device-localization pattern is illuminated. Furthermore, because IR light is used, the image-based localization is less likely to be compromised by other sources of environmental light, such as the flashing lights 106 shown in FIG. 1.

Figure 2:
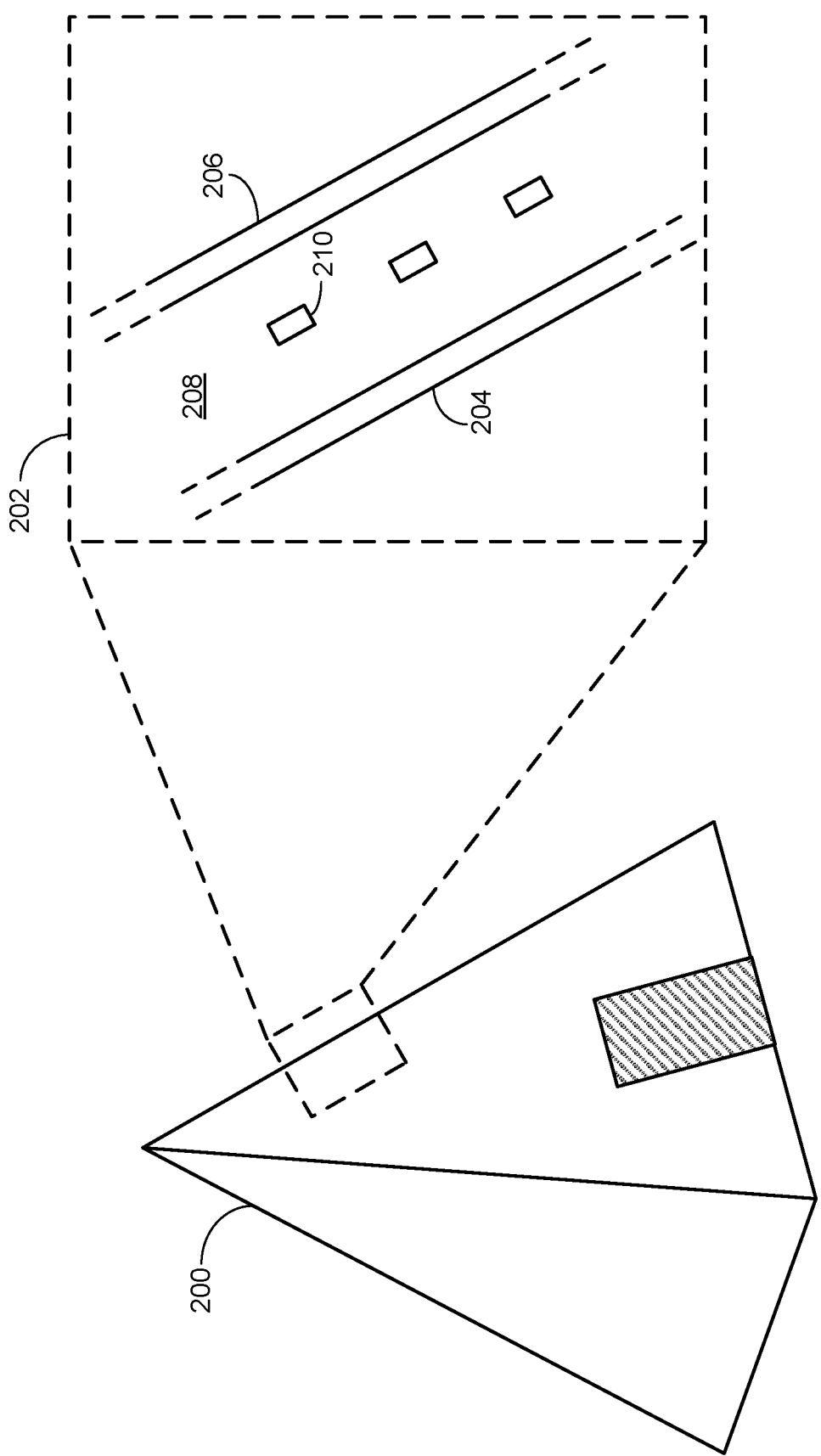
FIG. 2 schematically shows an example structure including a structural support.

FIG. 2 schematically shows an example structure 200 for facilitating virtual experiences. In this example, the structure is a pyramid. More particularly, the base of the pyramid may have dimensions of approximately 35×35 meters to accommodate a number of users within its interior. However, in other examples, the structure may be any size and shape. The interior of the structure may be one single room or include any number of internal rooms separated by walls or barriers. Similarly, the structure may include any number of different floors or levels. The structure may be constructed of any suitable materials, including wood, concrete, glass, metal, canvas, fiberglass, plastic, etc. The structure may be a permanent structure—e.g., anchored into a concrete foundation—or the structure may be temporary—e.g., a tent.

As shown in FIG. 2, the structure includes a structural support 202 having a first side 204 facing toward an interior of the structure, a second side 206 opposite the first side, and an intra-support hollow 208 disposed between the first and second sides. In this example, the structural support is an external wall of the structure and separates the interior of the structure from an outside environment. Alternatively, however, the structural support may be an internal wall of the structure and separate a first internal room from a second internal room. In further examples, the structural support need not be any sort of wall, but rather may be part of a floor or ceiling, or other structural element, such as a column, walkway, or door.

The structural support may have any suitable configuration. As will be described in more detail below, a structural support may include one or more IR light emitters 210 configured to emit IR light that ultimately enters the interior of the structure, where it may be detected by mixed reality devices. To this end, the first side of the structural support 204 may be constructed in such a way that allows IR light to pass from the intra-support hollow into the interior of the structure. Thus, one or both sides of the structural support may be constructed from a material that is at least partially transparent to IR light. Additionally, or alternatively, the first side of the structural support may include gaps or holes for IR light to pass through. For instance, the structural support may include a stud, girder, pillar, column, or similar element, or an interlinking grid of such elements (e.g., a scaffolding), and IR light may be emitted through spaces between such structural elements.

Figure 3:
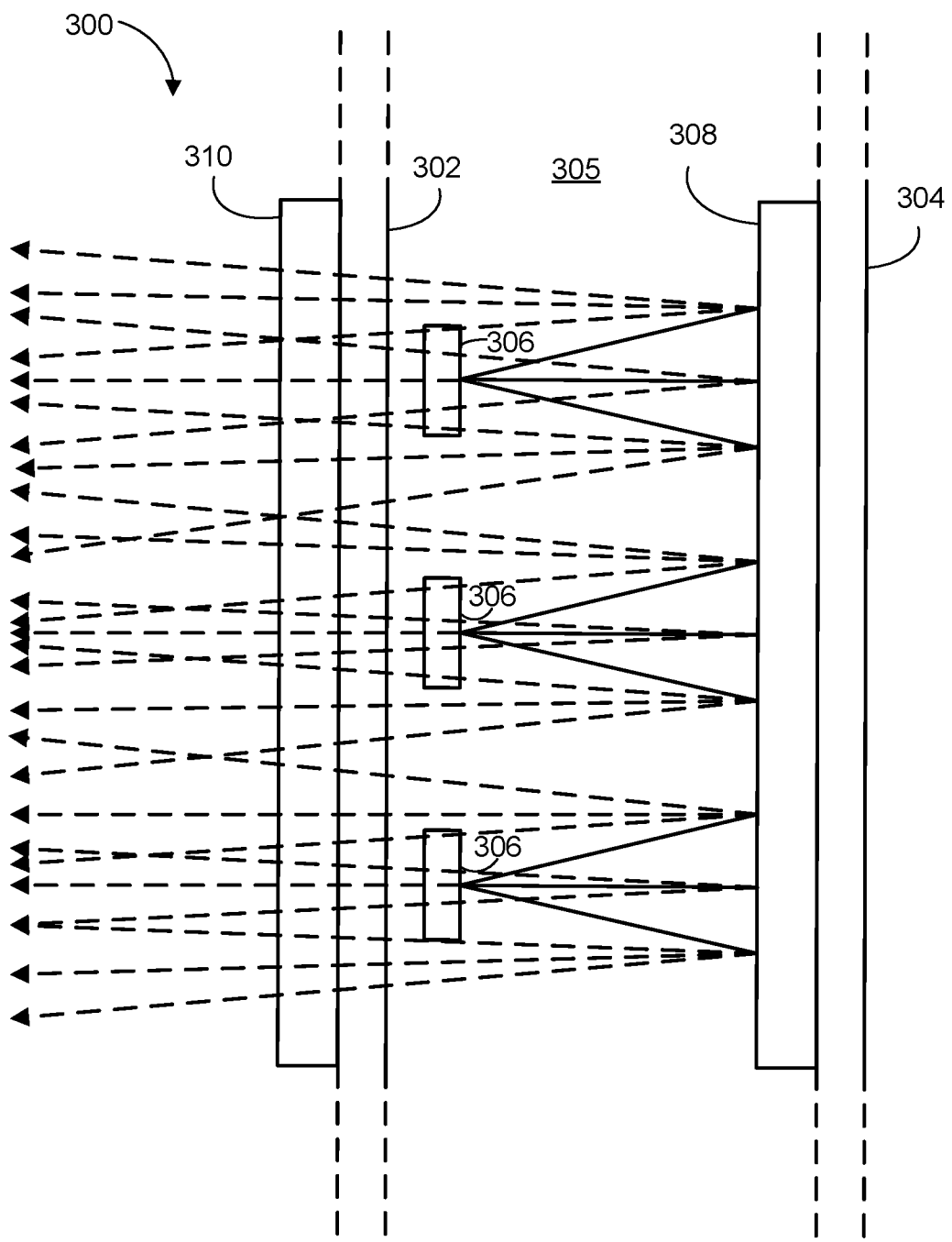
FIG. 3 schematically shows an example structural support including an infrared (IR) light emitter.

FIG. 3 schematically shows a different structural support 300 in more detail. As with support 202, structural support 300 includes a first side 302 and a second side 304, with an intra-support hollow 305 between the two sides. Also shown is several IR emitters 306 within the hollow between the first and second sides. Each IR emitter is configured to emit IR light toward an IR reflective surface 308, such that the IR light is reflected toward the interior of the structure. In some cases, the IR reflective surface may be a Lambertian reflective surface configured to reflect light in all directions. This is illustrated in FIG. 3, in which the IR light initially emitted by the IR emitters is shown in black solid lines, while IR light reflected by the IR reflective surface 308 is shown in dashed lines. As shown, the reflected IR light passes through the hollow and first side of the structural support and enters the interior of the structure. Furthermore, in some cases the IR emitter may be configured to project light over a large solid angle. When used in tandem with a Lambertian reflective surface, each ray of light emitted may be reflected over a large solid angle, increasing the homogeneity of the reflected IR light.

Each IR emitter may be any suitable device capable of emitting light in the IR range. As one example, an IR emitter may be a light emitting diode (LED), although other spectrally narrow suitable light-producing devices may instead be used. Each IR emitter may include a single light-producing element (e.g., LED), or include an array of such elements. Each IR emitter may be configured to emit IR light continuously or in pulses. Furthermore, while only three IR emitters are shown in FIG. 3, the structural support may in some cases include a plurality of additional light emitters, each configured to emit IR light toward the IR reflective surface, such that the IR light is reflected toward the interior of the structure. The individual IR light emitters may have any suitable spacing, including irregular spacings. In one example, each of the plurality of IR emitters may be arranged in a 2-dimensional array, with each element separated by a distance of 1-5 meters. Furthermore, the spacing of the IR emitters may influence the spacing between the first and second sides of the structural support. For instance, when there is a spacing of 5 meters between the IR emitters, the first and second sides may be spaced 1-3 meters apart, although this is not limiting.

As noted above, structural support 300 includes an IR reflective surface 308 configured to reflect light emitted by IR emitter 306 toward the interior of the structure. The IR reflective surface may be adjacent to at least a portion of the second side of the structural support. For instance, the IR reflective surface may be a separate structural element that is attached to the second side, or the IR reflective surface may be a reflective coating applied to the second side. Alternatively, the second side of the structural support may be constructed from a material that is itself reflective to IR light, in which case the IR reflective surface and the second side of the structural support may be the same. The IR reflective surface may include any suitable IR reflective materials, including suitable metals, pigments, dielectric coatings, etc. In some cases, the IR reflective surface may be further configured to diffuse the reflective IR light, as shown in FIG. 3. IR light may be diffused in any suitable way—e.g., via a coating applied to the IR reflective surface, or as a property of the materials used to construct the IR reflective surface.

Figure 4:
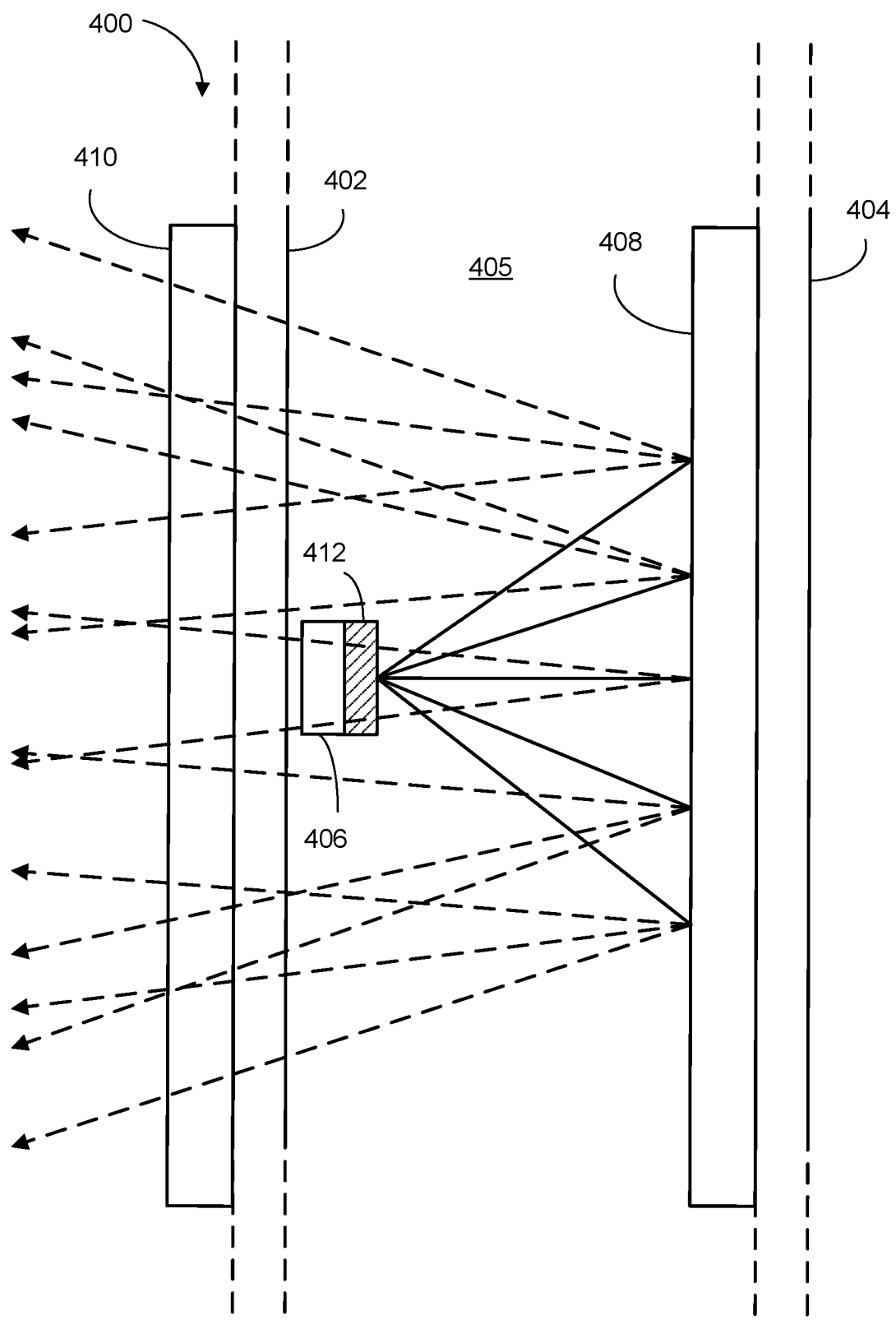
FIG. 4 schematically shows another example structural support including an IR light emitter.

Additionally, or alternatively, the IR light may be diffused in other suitable ways. For example, FIG. 4 shows an alternative structural support 400, again including a first side 402, second side 404, intra-support hollow 405, and IR light emitter 406. Emitter 406 is configured to emit IR light toward an IR reflective surface 408. However, unlike emitter 306, emitter 406 includes a diffusing element 412 configured to diffuse the IR light emitted toward the IR reflective surface. The diffusing element will typically take the form of a diffusing lens or similar optic, although any suitable structure may be used. As with reflective surface 308, surface 408 may in some cases be a Lambertian reflective surface, such that each ray of incident IR light is reflected in a plurality of directions. For visual clarity, only one IR emitter is shown in FIG. 4, although as with FIG. 3, any suitable number of emitters may be used, including a 2-dimensional array of emitters.

Returning briefly to FIG. 3, structural support 300 also includes an IR transmissive surface 310, which is adjacent to at least a portion of the first side of the structural support. Thus, the IR light reflected toward the interior of the structure is transmitted through the IR transmissive surface. The IR transmissive surface may be constructed from any material that is at least partially transparent to IR light. In some implementations, the IR transmissive surface may include at least some sections that are opaque or reflective to visible light, such that any users present in the interior of the structure cannot see through the IR transmissive surface and into the intra-support hollow, and such that real-world video content may be projected onto the IR transmissive surface in the visible spectrum. It will be understood, however, that at least some portions of the IR transmissive surface will be optically transmissive to IR light. As one example, the IR transmissive surface may be a synthetic fabric covering the first side of the structural support, although other suitable materials may be used. Such a fabric may extend between a plurality of individual structural supports—e.g., pillars, columns, studs—such that IR light may be transmitted through the fabric between such supports.

Figure 5:
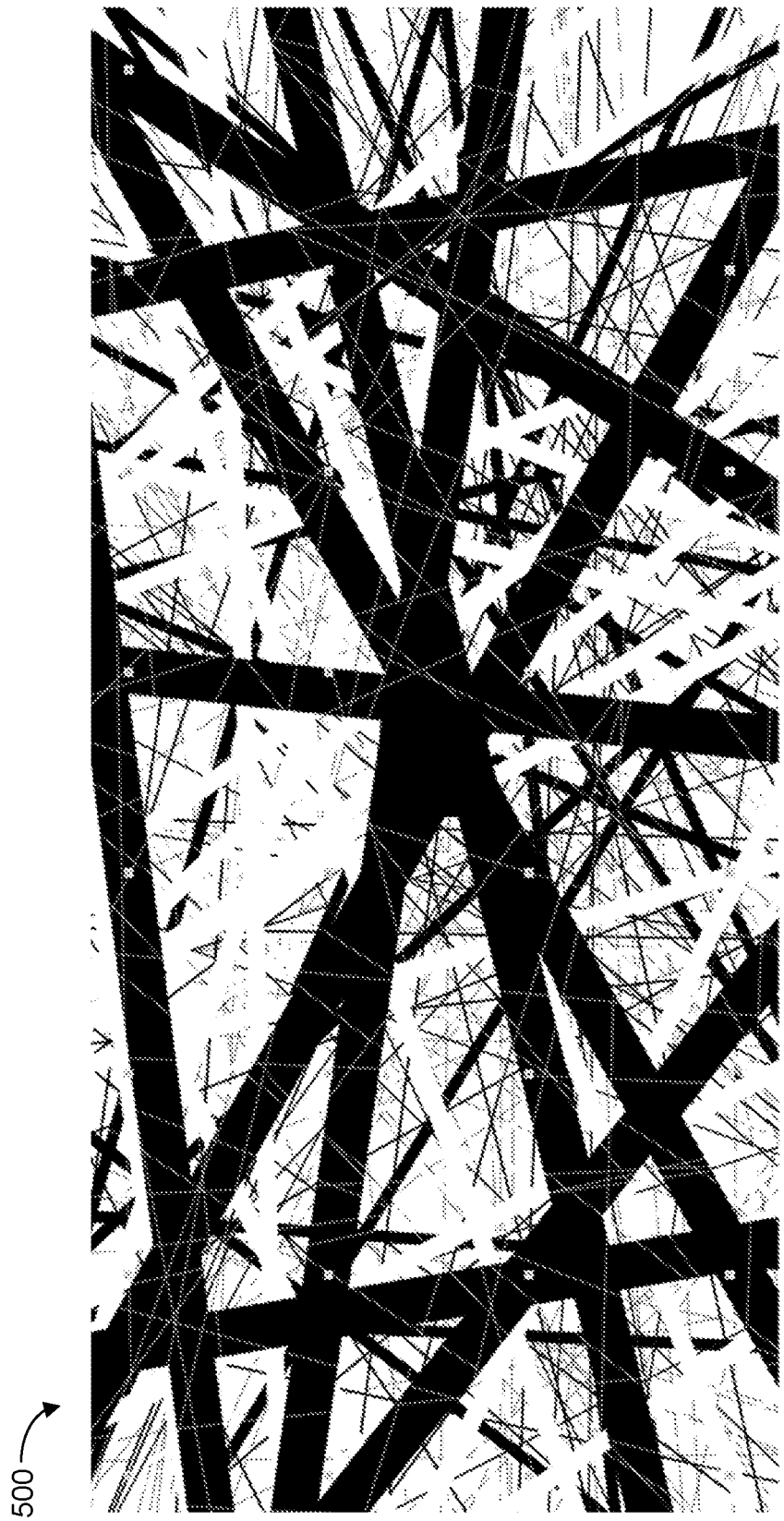
FIG. 5 shows an example non-repetitive device-localization pattern.

As discussed above, in some cases the IR transmissive surface may include a non-repetitive device-localization pattern that is detectable by mixed reality devices present in the interior of the structure. This is illustrated in FIG. 5, which shows an example pattern 500 that may be applied to an IR transmissive surface. Notably, IR light passing through the IR transmissive surface may illuminate the device-localization pattern, enabling mixed reality devices to detect unique features present in the pattern, and thereby determine their real-world positions using image-based localization. Furthermore, the extent to which the IR transmissive surface is patterned may vary from implementation to implementation. In some cases, only one or more patches of the IR transmissive surface may include the device-localization pattern. In other cases, the entire IR transmissive surface may include the pattern. For instance, the IR transmissive surface may take the form of a fabric applied to the entire wall of a structure, such that the entire wall includes the device-localization pattern.

Notably, as discussed above, the IR light is first emitted away from the IR transmissive surface and toward the IR reflective surface. When the IR light is also diffused, either by the IR emitter or IR reflective surface, a relatively uniform illumination of the IR transmissive surface may be achieved. This differs from implementations in which IR light is emitted directly toward the IR transmissive surface. In such cases, significant blooming effects may be observed, which can compromise the ability of the mixed reality devices to detect unique features present in the device-localization pattern.

The non-repetitive device-localization pattern may be applied to the IR transmissive surface in any suitable way. In one example, the device-localization pattern may be printed on the IR transmissive surface—e.g., using a suitable pigment or coating that may or may not absorb light in the visible spectrum. In other words, the non-repetitive device-localization pattern may or may not be visible to users in the interior of the structure. As a different example, the non-repetitive device-localization pattern may be projected onto the IR transmissive surface using a suitable projector, and again may or may not be visible to users within the structure.

The non-repetitive device-localization pattern may be detected by the mixed reality devices in any suitable way—e.g., via cameras used to localize a user's head position with respect to the surrounding surfaces. In one example, the mixed reality devices may include a camera configured to detect IR wavelengths of light (e.g., using a bandpass filter that only allows for transmission of a narrow wavelength range of 20-50 nm), by which the mixed reality device may image the device-localization pattern illuminated when illuminated by the IR emitters. As discussed above, image-based localization typically requires that the mixed reality device be able to detect and distinguish some number of unique features, each having known real-world positions. Thus, the device-localization pattern is "non-repetitive," meaning any given portion of the device-localization pattern may be distinguished from other portions of the pattern. This is not to say that the device-localization pattern cannot include the exact same feature more than one time, but rather that the features are distributed in such a way that a mixed reality device can determine its own real-world position from anywhere within the interior of the structure given the features detectable from its current position. Furthermore, it is generally beneficial for the device-localization pattern to be substantially rigid, as any movement of the pattern relative to the environment can compromise the ability of the mixed reality devices to perform image-based localization, as such techniques typically assume that any detected features are static relative to the surrounding environment.

The device-localization pattern shown in FIG. 5 is a non-limiting example. Rather, any suitable device-localization pattern may be used that includes sufficient unique features for image-based localization. Such patterns will beneficially have sharp edges with high spatial frequency contrast.

In an example, a structure for facilitating virtual experiences comprises: a structural support having a first side facing toward an interior of the structure, a second side opposite the first side, and an intra-support hollow disposed between the first and second sides; an IR reflective surface adjacent to at least a portion of the second side of the structural support; and an IR emitter within the hollow between the first and second sides, the IR emitter configured to emit IR light toward the IR reflective surface, such that the IR light is reflected toward the interior of the structure. In this example or any other example, the IR reflective surface is configured to diffuse the IR light reflected toward the interior of the structure. In this example or any other example, the IR emitter includes a diffusing element configured to diffuse the IR light emitted toward the IR reflective surface. In this example or any other example, the structure further comprises an IR transmissive surface adjacent to at least a portion of the first side, such that the IR light reflected toward the interior of the structure is transmitted through the IR transmissive surface. In this example or any other example, the IR transmissive surface is a synthetic fabric covering the first side of the structural support. In this example or any other example, the IR transmissive surface includes a non-repetitive device-localization pattern detectable by mixed reality devices present in the interior of the structure. In this example or any other example, the non-repetitive device-localization pattern is printed on the IR transmissive surface. In this example or any other example, the structure further comprises a visible-light projector configured to project video content toward the IR transmissive surface, such that the video content is visible to human users in the interior of the structure. In this example or any other example, the structure further comprises a plurality of additional IR emitters disposed in the hollow between the first and second sides of the structural support, each of the plurality of additional IR emitters configured to emit IR light toward the IR reflective surface, such that the IR light is reflected toward the interior of the structure. In this example or any other example, each of the plurality of additional IR emitters are separated by a distance of 1-5 meters. In this example or any other example, the structural support is an external wall of the structure and separates the interior of the structure from an outside environment. In this example or any other example, the structural support is an internal wall of the structure, the interior of the structure is a first internal room of the structure, and the structural support separates the first internal room from a second internal room.

In an example, a structure for facilitating virtual experiences comprises: a structural support having a first side facing toward an interior of the structure, a second side opposite the first side, and an intra-support hollow disposed between the first and second sides; an IR transmissive surface adjacent to at least a portion of the first side of the structural support; an IR reflective surface adjacent to at least a portion of the second side of the structural support; and an IR emitter within the hollow between the first and second sides, the IR emitter configured to emit IR light toward the IR reflective surface, such that the IR light is reflected toward the IR transmissive surface and transmitted into the interior of the structure. In this example or any other example, the IR transmissive surface is a synthetic fabric covering the first side of the structural support. In this example or any other example, the IR transmissive surface includes a non-repetitive device-localization pattern detectable by mixed reality devices present in the interior of the structure. In this example or any other example, the non-repetitive device-localization pattern is printed on the IR transmissive surface. In this example or any other example, the IR reflective surface is configured to diffuse the IR light reflected toward the IR transmissive surface. In this example or any other example, the structure further comprises a plurality of additional IR emitters disposed in the hollow between the first and second sides of the structural support, each of the plurality of additional IR emitters configured to emit IR light toward the IR reflective surface, such that the IR light is reflected toward the interior of the structure. In this example or any other example, the structural support is an external wall of the structure and separates the interior of the structure from an outside environment.

In an example, a structure for facilitating virtual experiences comprises: an external wall separating an interior of the structure from an outside environment, the external wall having a first side facing toward the interior of the structure, a second side opposite the first side, and an intra-support hollow disposed between the first and second sides; an IR transmissive fabric covering at least a portion of the first side of the structural support, the IR transmissive fabric including a non-repetitive device-localization pattern detectable by mixed reality devices present in the interior of the structure; a diffusing IR reflective surface adjacent to at least a portion of the second side of the structural support; and a plurality of IR emitters within the hollow between the first and second sides, each of the plurality of IR emitters configured to emit IR light toward the diffusing IR reflective surface, such that the IR light is diffused and reflected toward the IR transmissive surface, and the IR light is transmitted by the IR transmissive surface into the interior of the structure.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A structure for facilitating virtual experiences, the structure comprising:
    a structural support having a first side facing toward an interior of the structure, a second side opposite the first side, and an intra-support hollow disposed between the first and second sides;
    an IR reflective surface adjacent to at least a portion of the second side of the structural support; and
    an IR emitter within the hollow between the first and second sides, the IR emitter configured to emit IR light toward the IR reflective surface, such that the IR light is reflected toward the interior of the structure.

2. The structure of claim 1, where the IR reflective surface is configured to diffuse the IR light reflected toward the interior of the structure.

3. The structure of claim 1, where the IR emitter includes a diffusing element configured to diffuse the IR light emitted toward the IR reflective surface.

4. The structure of claim 1, further comprising an IR transmissive surface adjacent to at least a portion of the first side, such that the IR light reflected toward the interior of the structure is transmitted through the IR transmissive surface.

5. The structure of claim 4, where the IR transmissive surface is a synthetic fabric covering the first side of the structural support.

6. The structure of claim 4, where the IR transmissive surface includes a non-repetitive device-localization pattern detectable by mixed reality devices present in the interior of the structure.

7. The structure of claim 6, where the non-repetitive device-localization pattern is printed on the IR transmissive surface.

8. The structure of claim 4, further comprising a visible-light projector configured to project video content toward the IR transmissive surface, such that the video content is visible to human users in the interior of the structure.

9. The structure of claim 1, further comprising a plurality of additional IR emitters disposed in the hollow between the first and second sides of the structural support, each of the plurality of additional IR emitters configured to emit IR light toward the IR reflective surface, such that the IR light is reflected toward the interior of the structure.

10. The structure of claim 9, where each of the plurality of additional IR emitters are separated by a distance of 1-5 meters.

11. The structure of claim 1, where the structural support is an external wall of the structure and separates the interior of the structure from an outside environment.

12. The structure of claim 1, where the structural support is an internal wall of the structure, the interior of the structure is a first internal room of the structure, and the structural support separates the first internal room from a second internal room.

13. A structure for facilitating virtual experiences, the structure comprising:
- a structural support having a first side facing toward an interior of the structure, a second side opposite the first side, and an intra-support hollow disposed between the first and second sides;
- an IR transmissive surface adjacent to at least a portion of the first side of the structural support;
- an IR reflective surface adjacent to at least a portion of the second side of the structural support; and
- an IR emitter within the hollow between the first and second sides, the IR emitter configured to emit IR light toward the IR reflective surface, such that the IR light is reflected toward the IR transmissive surface and transmitted into the interior of the structure.

14. The structure of claim 13, where the IR transmissive surface is a synthetic fabric covering the first side of the structural support.

15. The structure of claim 13, where the IR transmissive surface includes a non-repetitive device-localization pattern detectable by mixed reality devices present in the interior of the structure.

16. The structure of claim 15, where the non-repetitive device-localization pattern is printed on the IR transmissive surface.

17. The structure of claim 13, where the IR reflective surface is configured to diffuse the IR light reflected toward the IR transmissive surface.

18. The structure of claim 13, further comprising a plurality of additional IR emitters disposed in the hollow between the first and second sides of the structural support, each of the plurality of additional IR emitters configured to emit IR light toward the IR reflective surface, such that the IR light is reflected toward the interior of the structure.

19. The structure of claim 13, where the structural support is an external wall of the structure and separates the interior of the structure from an outside environment.

20. A structure for facilitating virtual experiences, the structure comprising:
- an external wall separating an interior of the structure from an outside environment, the external wall having a first side facing toward the interior of the structure, a second side opposite the first side, and an intra-support hollow disposed between the first and second sides;
- an IR transmissive fabric covering at least a portion of the first side of the structural support, the IR transmissive fabric including a non-repetitive device-localization pattern detectable by mixed reality devices present in the interior of the structure;
- a diffusing IR reflective surface adjacent to at least a portion of the second side of the structural support; and
- a plurality of IR emitters within the hollow between the first and second sides, each of the plurality of IR emitters configured to emit IR light toward the diffusing IR reflective surface, such that the IR light is diffused and reflected toward the IR transmissive surface, and the IR light is transmitted by the IR transmissive surface into the interior of the structure.

* * * * *